United States Patent [19]

Hobart

[11] Patent Number: 5,176,357
[45] Date of Patent: Jan. 5, 1993

[54] SUCTION-CUP RELEASE MECHANISM

[76] Inventor: Marshall, II D. Hobart, 506 San Jacinto, Redlands, Calif. 92373

[21] Appl. No.: 725,228

[22] Filed: Jun. 26, 1991

Related U.S. Application Data

[63] Continuation of Ser. No. 524,590, May 7, 1990, abandoned.

[51] Int. Cl.$^5$ ............................................. F16M 13/00
[52] U.S. Cl. ............................. 248/683; 160/DIG. 2; 160/DIG. 13; 248/205.8
[58] Field of Search ................ 160/DIG. 2, DIG. 13; 248/205.8, 205.9, 683, 205.5, 205.6, 205.7, 206.1, 206.2, 206.3, 206.4, 309.3, 363

[56] References Cited

U.S. PATENT DOCUMENTS

| | | | |
|---|---|---|---|
| 1,883,791 | 10/1932 | Jewell | 248/205.5 X |
| 2,028,640 | 1/1936 | Zaiger | 248/206 |
| 2,171,053 | 8/1939 | White et al. | 248/205.8 X |
| 2,190,550 | 2/1940 | Simmons | 248/205.7 |
| 2,623,369 | 12/1942 | Haydu | 248/363 X |
| 2,632,669 | 8/1946 | Piwczynski et al. | 296/97 |
| 2,706,659 | 8/1952 | Landis | 296/97 |
| 2,720,415 | 12/1952 | Helvey, Jr. et al. | 296/95 |
| 2,722,978 | 11/1955 | Frisk | 160/DIG. 2 X |
| 2,739,632 | 3/1956 | Rodriguez | 248/205.8 X |
| 2,908,473 | 10/1959 | Snyder | 248/205.5 X |
| 3,514,065 | 5/1970 | Litt et al. | 248/206.2 X |
| 3,750,991 | 8/1973 | Ragir | 248/206 |
| 4,580,751 | 4/1986 | Panzer | 248/205.8 |
| 4,846,429 | 7/1989 | Scheurer et al. | 248/205.8 |

FOREIGN PATENT DOCUMENTS

| | | | |
|---|---|---|---|
| 682751 | 3/1964 | Canada | 248/205.8 |
| 383690 | 11/1932 | United Kingdom | 248/205.8 |
| 699748 | 11/1953 | United Kingdom | 248/205.8 |

Primary Examiner—David L. Talbott
Attorney, Agent, or Firm—Blakely, Sokoloff, Taylor, Zafman

[57] ABSTRACT

A suction device (20) including an elastic diaphragm (30) with a lever (45) attached to the surface of diaphragm (30) by appendages (40, 41) and an attachment means (26, 98), a sun or glare screen (50), and handle (60). Handle (60) is inserted through screen (50) into opening (102) of diaphragm (30). Lever 45 provides a quick method of releasing suction device (20) from surface (10), using a natural one-handed operation.

34 Claims, 3 Drawing Sheets

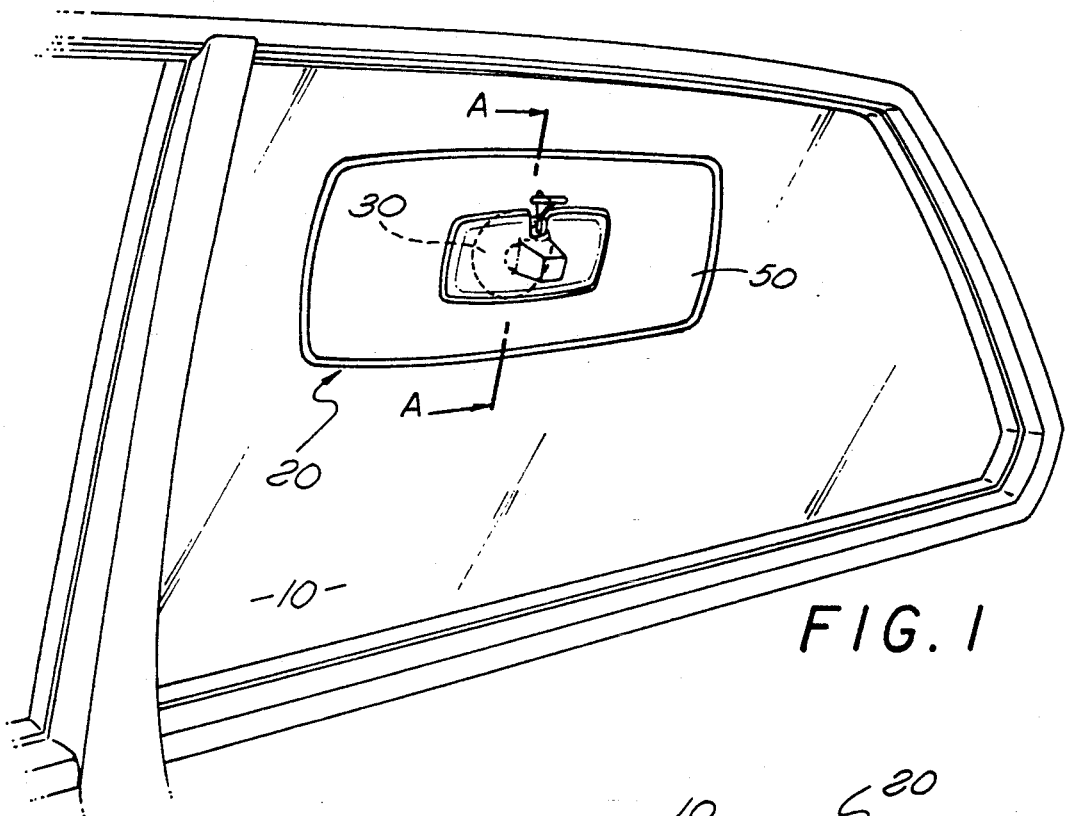
FIG. 1
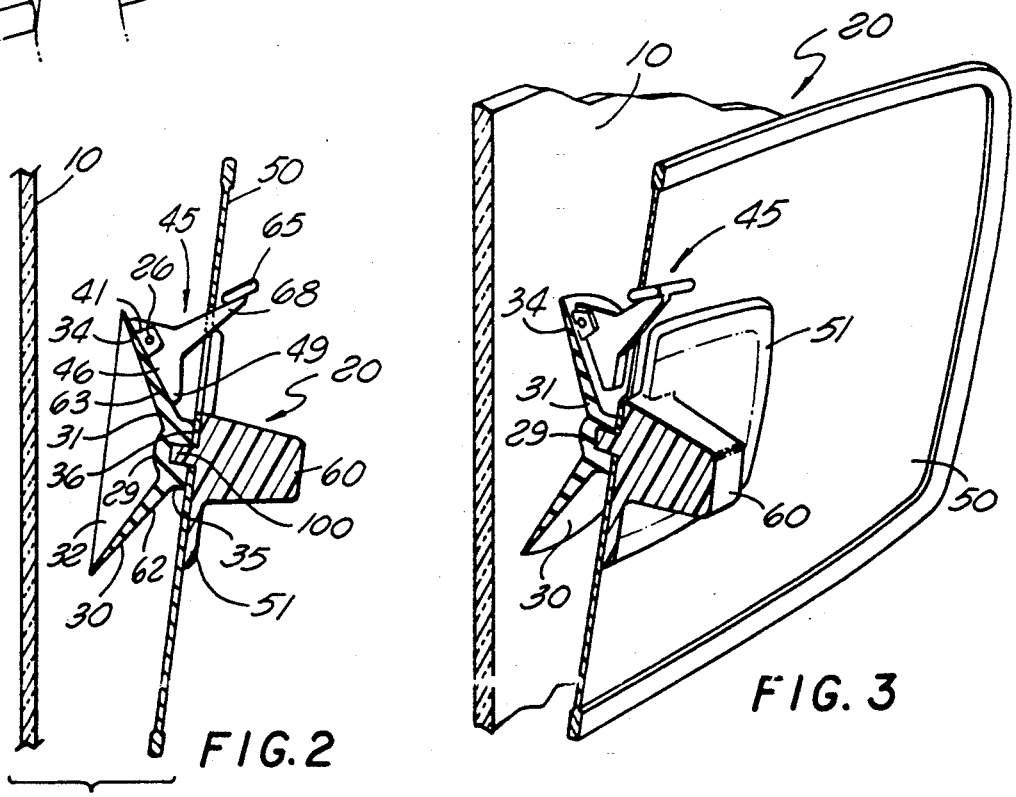
FIG. 2
FIG. 3

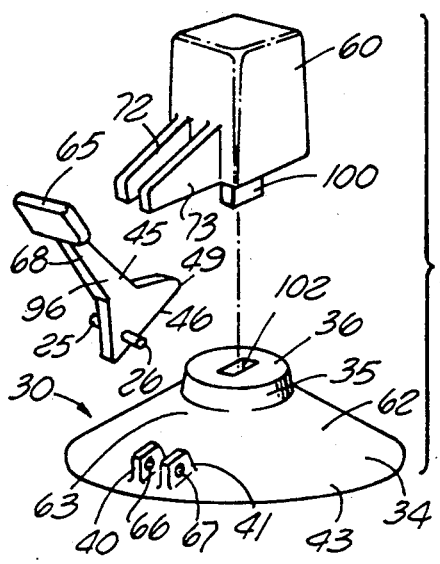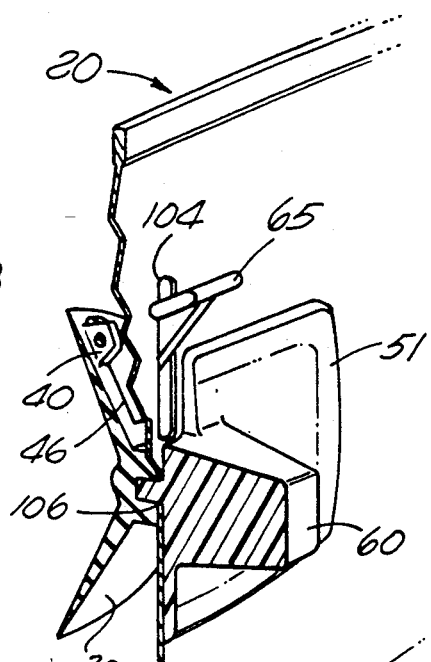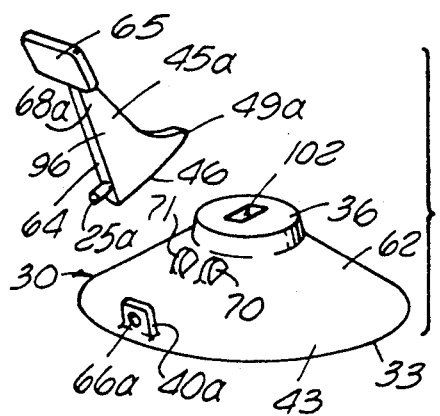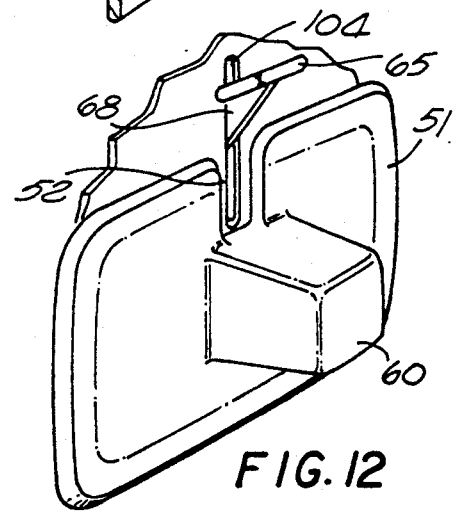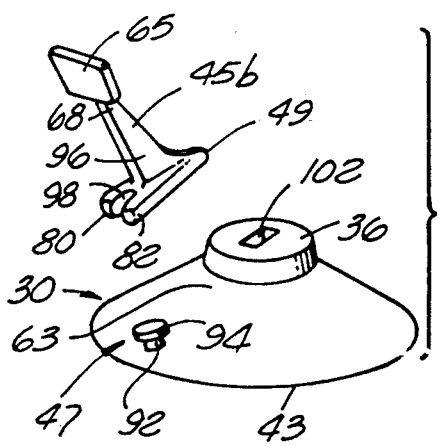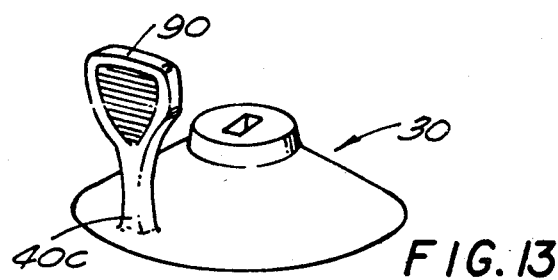

SUCTION-CUP RELEASE MECHANISM

This is a continuation of application Ser. No. 07/524,590 filed May 17, 1990, which was abandoned upon the filing hereof.

FIELD OF THE INVENTION

The origin of the suction-cup, or more accurately vacuum-cup, is unclear although the device seems to have a relatively long history. Modern plastics have greatly improved the device's functioning and various uses. In fact, unlike early examples made of rubber and crude plastic compounds, the current devices are so efficient they are sometimes difficult to remove once adhered.

Vacuum-cups varying from one-half inch up to three and four feet in diameter are utilized throughout industry in primarily lifting functions on materials such as paper, glass and sheet metal. Most utilize vacuum pump systems and release valves functioning through the central hub or neck area. Manual uses in industry comprise devices similar to those shown in U.S. Pat. Nos. 2,028,640 issued to Zaiger, 3,750,991 issued to Ragir, and 4,580,751 issued to Panzer. Products utilizing a cam-lever to lift the inner-dome of a two-piece cup require two handed operation, where the cup(s) are held in position with one hand while the cam-lever is turned to the vacuum or lifting position. The vacuum is maintained as long as the cam remains in that position, and released when it is turned in the opposite direction to lower the inner dome. Examples of such devices are small clip boards for note taking which are adhered to an auto windshield and certain workshop tools such as vise and clamp bases.

A more common configuration currently utilized in consumer suction cups merely provides a small tab or appendage located near the cup's outer perimeter edge. An adhered cup is released by the user grasping the tab by the finger tips or finger nails and manually pulling the entire cup away from the surface. This results in the need to use both hands, again, as the object being supported by the cup may have to be handled by the second hand as the finger tips of the first hand effect release. Additionally, the grasping of the small tab can be difficult requiring good vision and fairly "steely" fingers.

SUMMARY OF THE INVENTION

The present invention contemplates an improved suction-type device for supporting articles on a surface, such as an automobile window, which offers a convenient and natural one-handed release operation.

The suction or vacuum device of the present invention includes an elastic diaphragm having a lever adjacent the top surface of the suction cup. As the suction cup is pressed against a surface, the cup flattens into a condition of compression. As the pressure against the surface is relaxed, a point of stability is reached where there is a shallow central dome and an outer skirt that is flattened out. A vacuum-line is created under the flattened portion encircling the central dome. To release the suction cup, pressure is applied against the lever in the direction of the cup's central hub, and through it's fulcrum configuration, the outer skirt of the suction cup is raised, effecting release of the vacuum. The device may be operated with one hand and full release effected with one finger, with even a quick, finger-flicking motion. The rapid on/off repositioning capability of the device is a major benefit of this invention.

BRIEF DESCRIPTION OF THE DRAWINGS

FIG. 1 is a perspective view of the device according to the present invention.

FIG. 2 is a sectional view thereof taken along line A—A of FIG. 1.

FIG. 3 is a sectional perspective view thereof taken along line A—A of FIG. 1.

FIG. 8 is an exploded perspective view of the invention.

FIG. 9 is an exploded perspective view of the invention.

FIG. 10 is an exploded perspective view of the invention.

FIG. 11 is a sectional perspective view of the invention.

FIG. 12 is a perspective view of the invention.

FIG. 13 is a perspective view of the invention.

DETAILED DESCRIPTION

Figure 4:
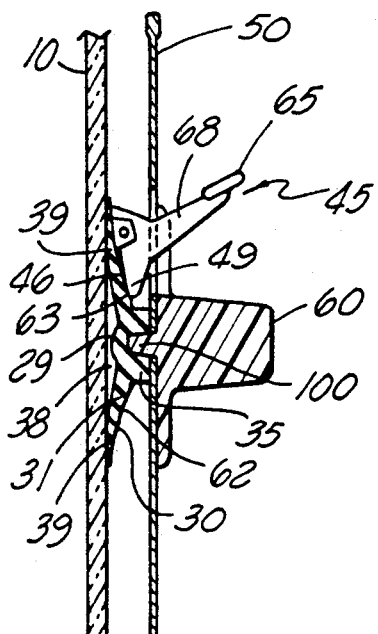
FIG. 4 is a sectional view taken along line A—A of FIG. 1.

FIG. 1 of the drawings generally shows a suction or vacuum device 20. The vacuum device 20, more clearly shown in a cross sectional view in FIG. 2, includes a resilient, flexible, elastic conical shaped cup or diaphragm 30 which is substantially circular and arcuate, having a convex surface and a concave surface, and is used to support articles such as a sun screen 50 on a flat or curved surface 10, such as a window pane or other smooth surface. The conical shaped cup 30 has basically spherical concavity 32 and operates in the customary manner of suction cup devices. Tabs or flanges 40, 41, as seen in FIGS. 2 and 8, are molded onto the thinner outer portion 34 of elastic diaphragm 30. Thus, diaphragm 30 and flanges 40, 41 are constructed as a one-piece unit, with flanges 40, 41 projecting outwardly from outer perimeter 43 of elastic diaphragm 30. Rigid lever 45 is secured between and attached to flanges 40, 41 by pins 25, 26. The base 46 of lever 45 parallels and lies adjacent the top surface 62 of conical shaped cup 30. Screen 50 is positioned adjacent the upper surface 36 of hub 35 of cup 30, as shown in FIG. 2 and 8, and is held in place against the upper surface 36 of hub 35 by handle 60. FIGS. 2 and 3 show suction device 20 in an assembled, uncompressed condition before being pressed against surface 10.

The sectional geometry of flexible cup or diaphragm 30 is important since, as shown in FIGS. 2 and 3, it requires a thicker interior region 31 which only minimally flexes, and a thinner outer region 34 which stretches, flattens, and can be easily distorted. Elastic diaphragm 30 is generally made from flexible vinyl or other synthetic materials which have rubber-like properties commonly found in the industry. Cup 30 may be transparent, opaque and/or colored. Size of cup 30 may range from a diameter of one-half inch to several inches, although a cup 30 having a diameter of one and three-fourths inches is most preferred.

Figure 5:
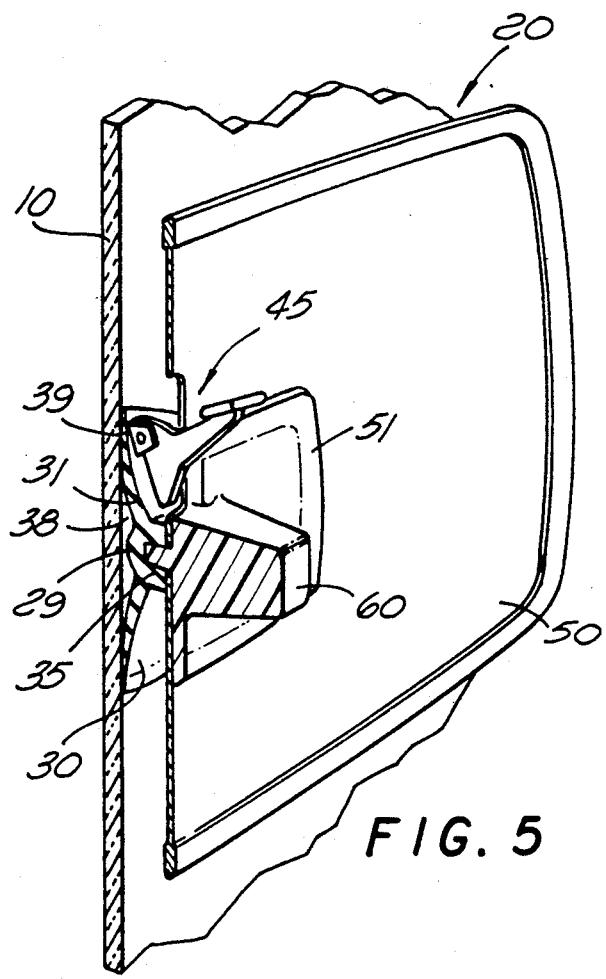
FIG. 5 is a sectional perspective view taken along line A—A of FIG. 1.
Figure 6:
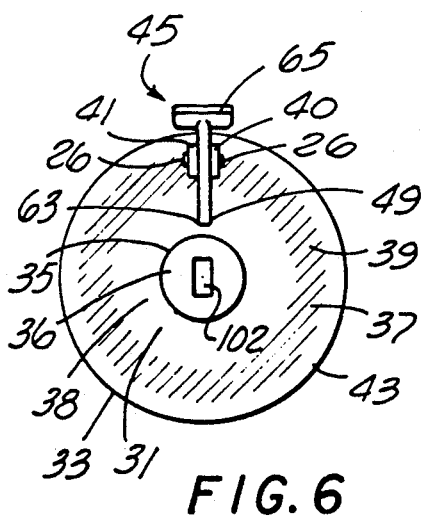
FIG. 6 is a top view of the device in a compressed condition.

Referring now to FIGS. 4 and 5, as resilient cup or diaphragm 30 is pressed against surface 10, the cup 30 flattens, with its circumference expanding slightly, into a condition of compression. The pressure applied to cup 30 can be manual or mechanical pressure. As the pressure on cup 30 and surface 10 is relaxed, the normal elasticity of the cup material attempts to return to its normal shape. The diaphragm 30 material reaches a point of stability where there is a shallow central dome 38 and an outer skirt 39 of cup 30 that is flattened out. A vacuum line 37 is created under the flattened portion of outer skirt 39 which encircles the central dome 38, as seen in FIG. 6. In its compressed state, therefore, the outer perimeter 43 and the thicker central interior region 31 in the central dome 38 area do not maintain a full vacuum contact with surface 10.

A full, tight vacuum contact appears to normally occur from about a twenty percent (20%) distance from the outer edge 33 of diaphragm 30, along the diaphragm's 30 radius, to about a fifty percent (50%) distance along the same line. As shown in FIG. 6, the relationship of the vacuum line 37 to the central hub 35 and the outer perimeter 43 of diaphragm 30 is particularly easy to discern if transparent materials are used for cup 30. It is important not to have full contact further inward of this general range because fulcrum 49 on lever 45 must function on the interior bearing point 63 behind the vacuum contact area, i.e., inside the vacuum line, when release of suction cup 30 from surface 10 is desired. Interior central bump or button 29 on the underside of inner hub 35 restricts excessive compression, as can be seen in FIGS. 4 and 5, so that full vacuum contact of entire cup 30 cannot be achieved with surface 10.

Base 46 of rigid lever 45 parallels the adjacent top surface 62 of cup 30. Lever base 46 extends from flanges 40, 41, toward the central hub 35, to a point above the interior dome region 38. This inner location is a bearing surface 63 for fulcrum 49 on lever 45, which stands perpendicular and upwardly from the diaphragm's 30 conical outward surface 62, as shown in FIG. 4. It is important that the fulcrum 49 of lever base 46 have a clearance of about ⅛ inch between fulcrum 49 and central hub 35 so that contact is not made with hub 35 during compression. The upward extension 68 of lever 45 rises to a finger pad 65 that can be manually actuated with ease, as can be seen for instance in FIGS. 2, 4, and 7. Upon compression of cup 30 against surface 10, lever 45 moves into a slightly more upright position as cup 30 flattens, with the lever's upward extension 68 moving approximately ⅛-¼ inch, preferably about 3/16 inch.

Figure 7:
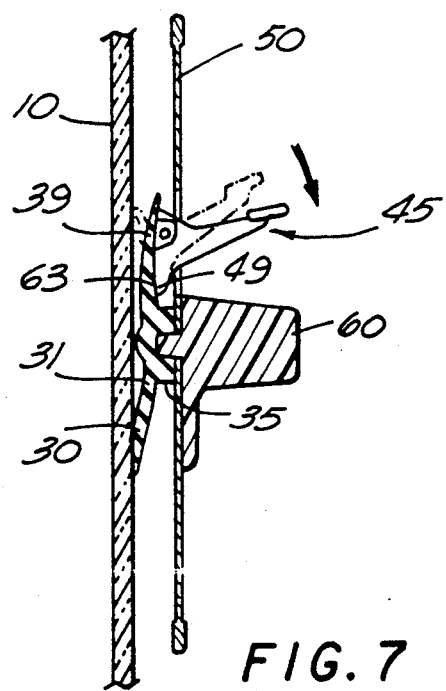
FIG. 7 is a sectional view taken along line A—A of FIG. 1.

Very slight movement and pressure, whether manually or mechanically, is required on finger pad 65 of lever 45 in the direction of diaphragm's 30 central hub 35 to effect release of the vacuum. FIG. 7 shows the movement of lever 45 during release of cup 30. Rigid lever 45 effectively pivots or rotates on its fulcrum 49 at the bearing point 63 because the thicker, interior region 31 of cup 30 is substantially stiff and resistant to deformation. Lever 45 does not flex between the appendages 40, 41, the fulcrum 49, or the upward extension 68 of lever 45. By moving the upward extension 68 of lever 45 in an inwardly direction toward central hub 35, as illustrated in FIG. 7, a rotation occurs on fulcrum 49 at the interior bearing point 63 and a lifting movement occurs at flanges 40, 41, on outer skirt 39 causing the desired atmospheric leak and vacuum release of cup 30. The flattened region of outer skirt 39 of diaphragm 30 is lifted as lever 45 is moved toward hub 35, permitting air to flow under outer skirt 39 and break or spoil the vacuum, as shown in FIG. 7. Generally, lever 45 is moved approximately ⅛ inch toward central hub 35 to effect release, the fulcrum 49 depressing into the interior bearing surface 63 about 0.005 to 0.010 inch, while only about five to six ounces of pressure is necessary against the finger pad 65 of lever 45 on a one and three-fourths (1¾) inch diameter cup 30. The lever is at maximum efficiency when there is a minimum of deformation at the fulcrum's bearing point 63. Lever 45 is preferably made from a rigid plastic, such as ABS or nylon, although any strong rigid plastic can be utilized. Alternatively, lever 45 can be made from a metal, such as aluminum or brass.

The lever attachment, such as flanges 40, 41, near the outer perimeter 43 of cup or diaphragm 30 can take on various configurations. One embodiment, shown in FIG. 9, is a single flange or appendage 40a extending upwardly from the top surface 62 of the diaphragm 30 parallel to the perimeter edge or rim 33 and perpendicular to lever base 46 along the diaphragm's 30 radius. A pin 25a located on the front edge 64 of the lever 45a extends into a corresponding hole 66a in flange 40a and holds the lever 45a to the flange 40a in a secure manner. While this configuration is simple, it may allow the inner, fulcrum area 49a of the lever 45a to freely swing from side to side as well as pivot at the pin 25a attachment. Generally, these free movements are not desirable. If the single flange 40a configuration is utilized, it is desirable to place guide appendages 70, 71 at each side of the fulcrum 49a, as shown in FIG. 9, as well as guide arms 72, 73 on each side of upward extension 68a as shown in FIG. 8. The guide arms 72, 73 can extend from the handle 60 in some applications, as shown in FIG. 8.

Alternatively, lever 45 can have two extending, parallel flanges from the lower section of lever 45. The two extending flanges can be secured with pin 25 to single flange 40, single flange 40 projecting outwardly and being perpendicular to the outer edge 33 of cup 30. Guide arms 72, 73 and guide appendages 70, 71, as described above, can optionally be utilized to reduce movement of lever 45.

The flat rectangular section 96 of the lever's upward extension 68 offers stability to the mechanism when guide arms 72, 73, as seen in FIG. 8, or a slotted opening 104, as shown in FIGS. 11 and 12, is in place around the lever's 45 mid-section and extends the outward limits of the lever's 45 travel. The wide flat section 96 within the slot 104 or guide arms 72, 73 of FIGS. 8, 11 and 12 restricts twisting and misalignment of lever 45.

The more preferred configuration has two flanges 40, 41 near the outer rim or perimeter 43, one on each side of lever 45, with pins 25, 26 extending from each of the adjacent sides of the lever 45 and securely into holes 66, 67 in flanges 40, 41, as shown in FIG. 8. This configuration effectively eliminates the need for the guide appendages 70, 71 at the fulcrum 49 location. Utilizing the two flange configuration is a more stable connection (since lever 45 will not rock or tip) which also doubles the effective lifting area on the outer skirt 39. It has been found that this slightly more inward flange attachment position, as shown in FIG. 8, when compared to the outward placement of the single flange in FIG. 9, corresponds more precisely with the vacuum line 37 and produces an easier, more rapid and precise release of cup 30 from surface 10. The single attachment point of flange 40a located near the outer edge 33 of diaphragm 30, as shown in FIG. 9, results in more flex and lift before the vacuum line 37 is affected and broken. In addition, if flanges 40, 41, flange 40a or appendage 47 are too near the outer edge 33 of diaphragm 30, diaphragm 30 peels off slowly from surface 10, without a rapid release effect. The use for which cup 30 is utilized determines whether a rapid release is desireable. For instance, a rapid release effect is desirable when cup 30 is utilized with screen 50 for use in a vehicle.

Alternatively, in another preferred embodiment, the lever 45b having two extending parallel flanges 80, 82 which create slot 98 can be secured to cup 30 by an appendage 47 on cup 30 which inserts into the slot receptacle 98 on lever 45b, as shown in FIG. 10. No pin is utilized for attaching lever 45b to cup 30. The appendage 47 can be of varying shapes, such as T-shaped with a post 92 and an enlarged top 94, as shown in FIG. 10. It is preferred to integrally mold appendage 47 to cup 30. Guide arms 72, 73, and guide appendages 70, 71, as described above, can optionally be utilized to reduce movement of lever 45b.

It is preferred that the appendage 47 or flanges 40, 41, or 40a whether in a single or multi-appendage configuration, be integrally molded onto elastic cup 30 for greater durability. However, the flanges can be attached to the suction cup 30 by other methods known in the industry, such as by an adhesive although perhaps the durability will typically not be as great. The flanges 40, 41, 40a are generally trapezoidal in shape, and are generally about 3/16 inch by 3/16 inch, although other shapes and sizes are within the contemplation of this invention. Holes 66, 67, 66a are located centrally in flanges 40, 41, 40a.

The configuration of rigid lever 45 can be of varied shapes, such as the shapes shown in FIGS. 8, 9 and 10. Height of lever 45 varies from one-half inch to one and one half inches, depending on the size of flexible suction cup 30. The larger the cup 30, the larger lever 45 must be for adequate leverage in releasing cup 30 from surface 10. When a 1¾ inch diameter cup 30 is used, for example, the lever 45 is preferably about one inch in height. If lever base 46 is too long for cup 30, the fulcrum 49 will contact hub 35, and will interfere with the proper flexing of the diaphragm 30. As a result, cup 30 will not properly adhere to surface 10 since the vacuum will not be effective. Lever base 46 is about one-half to five-eighths inches in length when a 1¾ inch diameter cup 30 is utilized.

It is preferred to attach lever 45 to flanges 40, 41 using pins 25, 26, since gluing lever 45 to cup 30 may disturb the flexibility of cup 30, causing cup 30 to prematurely release without holding the vacuum. Pins 25, 26 can be made from metal wire or integrally molded with lever 45, thereby being of the same material as the lever.

In order for the present invention to correctly function, it is important that a rigid lever 45 be used in conjunction with a flexible, elastic cup 30 because lever 45 must efficiently transfer pressure and movement, and, in particular convert, through the action of fulcrum 49, the natural, one-finger, push-button-like inward motion of the upward extension 68, through an angle of approximately ninety degrees, to an upward motion at the skirt attachment point. This requires that no bending or flexing occur throughout the entire lever 45 and that bending and flexing be limited to and occur only in the thin outer skirt region 39 of cup 30.

As shown in FIG. 13, extensions of varying heights and sizes in the form of enlarged finger-grips 90 can be attached or molded onto flanges or appendages 40c on cup 30 for the purpose of extending release means into a more accessible and convenient position. No rigid levers or fulcrum areas are utilized. The device is removed from surface 10 (not shown) by pulling the enlarged finger-grip 90 in a direction away from surface 10.

Handle 60 located on the upper surface 36 of cup 30, shown in FIG. 2, can facilitate use of vacuum device 20 and can take on different forms. As shown in FIG. 2, a handle 60 can be used to grasp vacuum device 20, utilizing the forefinger of the hand to work the lever 45 to effect release of the diaphragm 30 in manual applications. Handle 60 can be solid or have a hollow interior. Alternatively, handle 60 can include a hole for the forefinger of the hand, in manual applications, so that the thumb works lever 45 to effect release of the diaphragm 30. Handle 60 is made of a rigid plastic, using materials such as ABS or polyurethane.

Elastic diaphragm or cup 30 can be attached to objects such as a sun or glare screen 50 by means of the handle 60. Stud 100 extending from the center of handle 60 is inserted into opening 102 of hub 35 of cup 30. Opening 102 extends from upper surface 36 into hub region 35, as can be seen in FIGS. 8, 9 and 10. Opening 102 is formed when cup 30 is molded. Stud 100 and opening 102 are configured in such a manner as to put handle 60 (in conjunction with guide arms 72, 73 or with slot clearance notch 52) in alignment with lever 45, as shown in FIGS. 8 and 12. Stud 100 and opening 102 can be varying of configurations to ensure proper alignment with lever 45, such as a rectangular configuration. Edges of stud 100 may be serrated, to hold more readily and produce better friction when stud 100 is inserted into opening 102 of hub 35 of cup 30.

The sun screen 50 can be round, horizontal, square or any other shape and can be of any size, such as a six inch round disk, or 4½ inch by ten inch horizontal panel, as seen in FIG. 1. Screen 50 may be of a wide range of materials, such as paper, thin corrugated cardboard, opaque or tinted plastic, transparent plastic with a screen-print or holes punched through-out, and the like. It is preferable that screen 50 material or substrate be flat. In addition, multiple cups 30 can be used to suspend different sized fabric sun screen pieces, such as twelve inches by twenty inches, in automobile or semi-truck windows, for example.

Screen 50 has a slot 104 cut adjacent the center hole of the screen for movement and support of lever 45, as seen in FIGS. 11 and 12, and also has a hole 106 through the center of screen 50 so that stud 100 of handle 60 can pass through to insert in opening 102 of cup 30. To reinforce and strengthen the screen's 50 center portion against slippage of the user's grip as vacuum device 20 is pressed against surface 10, a finger guard base 51 is formed with handle 60, as shown in FIG. 12.

Flexible diaphragm 30 with novel rigid lever 45 configuration can be advantageously used in numerous applications. Attaching sun screen 50 to diaphragm 30 creating vacuum device 20, can be used in different locations in an automobile, aircraft, truck or other vehicle, as well as residential, office or restaurant windows where glare occurs. For instance, vacuum device 20 can be easily and quickly applied to the side or rear window of an automobile or semi truck when the sun is low in the sky to block the glaring sun above the traffic level.

Since the position of the sun changes rapidly at sunrise or sunset or while turning a vehicle, it is advantageous to quickly release the cup 30 utilizing a light finger tap from one hand on lever 45 and move the sun screen - diaphragm device 20 to a different location to block the glaring sun in a quick, efficient and safe manner with that same hand. No tugging or pulling of suction device 20 is necessary since cup 30 releases readily and quickly once lever 45 is pushed inwardly toward hub 35. A distinct advantage of the present invention is that one hand can move lever 45 to release the vacuum of cup 30, remove suction device 20 from surface 10, and then re-position and apply suction device 20 on another location on surface 10, all within a few seconds of time. The suction device 20 including the sun screen 50 works well on flat or curved glass surfaces, such as automobile or truck windows, or on flat or curved acrylic surfaces, such as in an aircraft.

When the diaphragm 30 is compressed against the surface 10, it is advantageous to have the surface 10 free of lint, dust, dirt or hair, since these disrupt vacuum formation. It is within the contemplation of this invention to use multiple diaphragms 30 on the vacuum device 20. As can be easily appreciated, one lever 45 can be positioned so as to release multiple cups 30 with a quick, flicking motion of the finger on one hand.

As can be appreciated, cups 30 can be made in many sizes, utilized for many purposes, and can be attached to many items, including but not limited to sun-screens and other auto accessories, laboratory test equipment and workshop tools, note/memo clips, ornament hangers and other household/bathroom accessories, toys and game boards and signs and advertising placards.

While this invention is susceptible of embodiment in many different forms, there is shown in the drawings and described herein in detail several specific embodiments, with the understanding that the present disclosure is to be considered as an exemplification of the principles of the invention and is not intended to limit the invention to the embodiments illustrated.

I claim:

1. A quick-release suction cup mechanism for attachment to a planar surface, comprising:
   (a) a cup member of flexible, elastic material, the cup member having an outer surface and a concave interior surface, the cup member also having a thicker interior region and a thinner outer rim region, and being attachable under suction to the planar surface when the cup member is flattened toward the planar surface; and
   (b) release means, the release means being secured to the cup member at the thinner rim region on the outer surface, and including movable rigid means extending from the thinner rim region to the thicker interior region of the outer surface to engage the cup member at the interior region and compress the cup member.

2. The suction cup mechanism of claim 1 above, wherein the release means comprises at least one upstanding flange attached to the outer surface, a lever with an upstanding handle and an arm, and attachment means, the lever being pivotally coupled between the upstanding handle and the arm to the at least one flange by the attachment means.

3. The suction cup mechanism of claim 2 above, wherein the arm of the lever extends from the at least one flange to the thicker interior region of the cup member and the lever pivots with respect to the interior region on the attachment means as the upstanding handle is displaced in the direction toward the interior region of the cup member, such that the free end of the arm engages and compresses the outer surface of the cup member in the interior region and the flange raises the thinner rim region of the cup member to allow atmospheric leakage into the volume between the concave surface of the cup member and the planar surface for release of the cup member.

4. The suction cup mechanism of claim 2 above, wherein the release member comprises two flanges, the flanges being perpendicular to the outer rim of the cup member.

5. The suction cup mechanism of claim 2 above, wherein the release member comprises one flange, the flange being parallel to the outer rim of the cup member.

6. The suction cup mechanism of claim 1, further comprising a sun and a fixed handle coupled to the cup member at the center of the outer surface thereof.

7. A vacuum cup mechanism for releasable attachment to a planar surface, comprising:
   a) a cup member of flexible, elastic material having a peripheral rim, the cup member having a convex surface and a concave surface, the concave surface being engageable to the planar surface;
   b) attachment means, the attachment means being securely positioned on the convex surface adjacent the rim of the cup member; and
   c) lever means of rigid material, the lever means being secured to the attachment means adjacent the convex surface of the cup member, wherein the lever means extends from the attachment means and moves to distort the cup member by compressing the interior region thereof while raising the rim relative to the planar surface such that the vacuum cup mechanism is quickly and easily released from a surface.

8. The vacuum cup mechanism set forth in claim 7, wherein the cup member has a thicker interior region and a thinner outer region.

9. The vacuum cup mechanism set forth in claim 8 above, wherein the lever means is pivotally secured to the attachment means near the rim of the cup member and includes a first manually movable arm and a second arm attached to the first arm and adjacent the thicker region of the cup member, the lever means being pivoted with the first arm moving in the direction of the thicker interior region of the cup member when release of the cup member is desired.

10. The vacuum cup mechanism set forth in claim 9 above, wherein the attachment means comprises at least one upstanding flange, the lever means being securely fastened to the upstanding flange.

11. The vacuum cup mechanism set forth in claim 9 above, wherein the attachment means comprises an upstanding post member having an enlarged portion positioned at one end of the post, and wherein the lever means further comprises a slot, the slot being a receptacle in which the post member resides for a secure fastening to the lever means.

12. A quick release suction cup member, comprising:
   a) a flexible, elastic conical diaphragm, the diaphragm having a thicker interior region and a thinner outer region, the diaphragm having a convex surface;
   b) attachment means, the attachment means being mounted on the convex surface of the diaphragm at the thinner outer region of the diaphragm;

c) lever means, the lever means being rigid, the lever means being secured to and attached to the attachment means adjacent the diaphragm, the lever means having an extension to the thicker interior region of the diaphragm and a manually operable handle, such that when the handle is urged towards the thicker interior region with the extension as a fulcrum, the thinner outer region of the diaphragm is raised at the attachment means, such that air is introduced under the diaphragm and release of the diaphragm thereby occurs.

13. The suction cup member of claim 12, further comprising:

a) a screen, the screen proximal the top surface of the diaphragm, the screen having a center hole and a radial slot adjacent the center hole; and b) a handle adjacent the screen, the handle having a stud extending from one end, the stud extending through the center hole in the screen and being coupled to the top surface of the diaphragm hub.

14. The suction cup member of claim 12, wherein the attachment means comprises at least one upstanding flange, the lever means being securely fastened to the at least one upstanding flange.

15. The suction cup member of claim 12, wherein the attachment means comprises an upstanding post member having an enlarged portion positioned at one end of the post, and wherein the lever means further includes means defining a slot defining a receptacle receiving the post member for secure fastening to the lever means.

16. A suction cup release mechanism comprising:

(a) a flexible diaphragm having a central hug region and an outer rim and attachable to a smooth surface;

(b) a rigid lever, said lever comprising a fulcrum for engagement with a bearing surface;

(c) attachment means for attaching said rigid lever to said flexible diaphragm;

whereby movement of said rigid lever in a direction parallel to said smooth surface causes said diaphram's outer rim to lift up.

17. The release mechanism of claim 16 wherein said lever comprises a pair of divergent arms suitable for transmitting movement through said attachment means to lift said diaphragm's outer rim to cause the release of vacuum.

18. The release mechanism of claim 17 wherein said lever means includes at least one of said divergent arms which is manually actuated.

19. The release mechanism of claim 18 wherein at least one of the divergent arms includes a finger-pad button at its extreme end for releasing by actuation of a single-finger.

20. The release mechanism of claim 16 wherein said lever further comprises fulcrum means for controllably altering the leverage and direction of movement of said lever means.

21. The release mechanism of claim 20 wherein said fulcrum means engages a bearing surface within said diaphragm's central hub region.

22. The release mechanism of claim 16 wherein said attachment means comprises at least one appendage extending from said lever and at least one flange with a receptacle located on said diaphragm's surface for receiving said appendage so as to effect a secure fastening.

23. The release mechanism of claim 16 wherein said attachment means comprises an appendage on said diaphragm's surface and a receptacle on said lever means for receiving said appendage so as to effect a secure fastening.

24. The release mechanism of claim 16 wherein said attachment means comprises an adhesive bond between said diaphragm and said lever.

25. The release mechanism of claim 16 wherein said suction cup release mechanism is in combination with a sun-screen device, wherein the sun-screen device can be secured, released and re-secured by one-hand operation.

26. A method of releasing an adhered suction-cup from an adjacent surface, the suction cup having a rigid lever attached thereto, the rigid lever including a fulcrum, comprising the steps of urging said rigid lever in a direction generally parallel with said adjacent surface and through said fulcrum, thereby producing a movement of said suction cup's perimeter rim generally perpendicular to said adjacent surface.

27. The method of claim 26 whereby said rigid lever moves in a direction other than the rim's generally perpendicular movement.

28. The method of claim 27 whereby said rigid lever moves in a direction generally opposite the rim's generally perpendicular movement.

29. A vacuum cup release mechanism comprising:

(a) a flexible, elastic conical diaphragm having a central hub region and an outer skirt, wherein said conical diaphragm is vacuum-attachable with a non-porous surface; and (b) leveraging means of rigid material comprising a fulcrum engagable with a bearing surface and further comprising attachment means to secure said leveraging means to said diaphragm so as to elevate said outer skirt's perimeter away from said non-porous surface upon actuating said leveraging means, thereby causing a break in vacuum.

30. The release mechanism of claim 29 wherein said vacuum cup comprises a diaphragm of convexo-concave configuration.

31. The release mechanism of claim 29 wherein said fulcrum engages a bearing surface within said diaphragm's central hub region.

32. The release mechanism of claim 29 wherein said leveraging means includes an extension member which is manually actuated.

33. The release mechanism of claim 32 wherein said leveraging means further comprises a flattened portion suitable for engagement by a finger tip.

34. The vacuum cup release mechanism of claim 29 in combination with a sun-shade device.

* * * * *

UNITED STATES PATENT AND TRADEMARK OFFICE
CERTIFICATE OF CORRECTION

PATENT NO. : 5,176,357
DATED : January 5, 1993
INVENTOR(S) : Hobart

It is certified that error appears in the above-indentified patent and that said Letters Patent is hereby corrected as shown below:

In the title page, at item [76], correct the Inventor's name from "Marshall, II D. Hobart," to —Marshall D. Hobart, II,—

Column 3, line 28, change "vacuum contact" to —vacuum/contact—

Column 8, line 19, change "Sun" to —sun screen—.

Signed and Sealed this

Fourth Day of July, 1995

Attest:

BRUCE LEHMAN

Attesting Officer

Commissioner of Patents and Trademarks